Patented Dec. 22, 1942

2,305,921

UNITED STATES PATENT OFFICE 2,305,921

PREPARATION OF ARTIFICIAL CRYOLITE

Josef Eringer, Munich, Germany; vested in the Alien Property Custodian

No Drawing. Application August 8, 1939, Serial No. 288,971. In Germany March 30, 1938

4 Claims. (Cl. 23—88)

The invention provides a method of manufacturing pure silica-free artificial cryolite by the reaction of aluminium fluoride with alkali metal silicofluorides at high temperatures and preferably in the absence of air or in the presence of an inert gas.

It is known that artificial cryolite can be made by mixing a solution of sodium fluoride with a solution of aluminium fluoride, the double fluoride which is insoluble in water being precipitated. Artificial cryolite can also be obtained by neutralizing an aqueous solution of hydrofluoric acid by means of alumina and soda. It is also known to make artificial cryolite by dissolving aluminium hydroxide in an excess of hydrofluoric acid and neutralizing the solution so obtained with sodium peroxide, whereupon the insoluble cryolite is precipitated. Artificial cryolite can also be obtained by melting together in a furnace fluorspar, potassium sulphate and coal, and dissolving out from the resultant melt by means of water the easily soluble potassium fluoride. The solution is then treated with sodium sulphate when the relatively insoluble sodium fluoride is precipitated, whilst the simultaneously resulting potassium sulphate can, after evaporation, be used with a fresh charge. The precipitated sodium fluoride is finally converted into cryolite by treatment with aluminium sulphate.

I have now found that pure silica-free cryolite can also be obtained by treating aluminium fluoride with alkali metal silicofluorides, which may have been obtained simultaneously by treatment of kaolin, at a high temperature and preferably in the absence of air or presence of an inert gas such as nitrogen.

An important difference between this method and the known methods previously referred to is that with a great number of these known methods it is necessary to operate with concentrated solutions of aluminium fluoride and sodium fluoride. As an excess of sodium fluoride must always be used and as this material has a small solubility only, the quantities of cryolite to be expected even with 100% reaction are very small compared with the huge quantities of liquid required.

Example 100 g. of dry pure aluminium fluoride, obtained for example by treatment of alumina, are intimately mixed with 30-35 g. of sodium silicofluoride obtained by the same treatment, and then slowly introduced into a slightly inclined rotatable reaction tube. The reaction tube itself is closed in a gastight manner and possesses in addition to a device for introducing the above mixture, a connection for leading in the necessary current of inert gas as well as a connection for removing the inert gas and the silicon tetrafluoride formed in the reaction. The reaction tube is heated to a temperature of 450-500° C. and is rotated once or twice per minute.

After about an hour the reaction is ended and I obtain pure practically silica-free cryolite nearly quantitatively, whilst the silicon tetrafluoride split off can be used again for obtaining further quantities of sodium silicofluoride and the excess inert gas (in this case nitrogen) is led back to the process.

Reaction equation

$$3\ Na_2SiF_6 + 2\ AlF_3 \longrightarrow 2Na_3AlF_6 + 3\ SiF_4$$

The artificial cryolite obtained by this method is characterized by great purity and in particular by the absence of silica.

What I claim is:

1. A process for the manufacture of pure silica-free artificial cryolite from silica-containing reactants comprising reacting an equivalent mixture of dry aluminum fluoride and alkali metal silico fluoride at a temperature of between about 450° and about 500° C.

2. A process for the manufacture of pure silica-free cryolite from silica-containing reactants comprising reacting an equivalent mixture of dry aluminum fluoride and alkali metal silico fluoride at a temperature of between about 450° and about 500° C. for a period of about one hour.

3. A process for the manufacture of pure silica-free cryolite from silica-containing reactants comprising reacting an equivalent mixture of dry aluminum fluoride and alkali metal silico fluoride at a temperature of between about 450° and about 500° C. in the presence of a dry inert gas.

4. A process for the manufacture of pure silica-free cryolite from silica-containing reactants comprising reacting an equivalent mixture of dry aluminum fluoride and alkali metal silico fluoride at a temperature of between about 450° and about 500° C. for a period of about one hour, and simultaneously conducting nitrogen over the material to be reacted.

JOSEF ERINGER.